(12) United States Patent
Barzilay et al.

(10) Patent No.: US 12,058,162 B2
(45) Date of Patent: Aug. 6, 2024

(54) CYBERSECURITY COMPLIANCE ENGINE FOR NETWORKED SYSTEMS

(71) Applicant: Honeywell International Inc., Morris Plains, NJ (US)

(72) Inventors: Sagi Barzilay, Hadera (IL); Israel Rozenblit, Ramla (IL); Avishay Mezeg, Ashdod (IL); Tarun Gupta, Bangalore (IN); Atul Bassi, Bangalore (IN); Anusha C., Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 242 days.

(21) Appl. No.: 17/363,299

(22) Filed: Jun. 30, 2021

(65) Prior Publication Data

US 2021/0409440 A1 Dec. 30, 2021

Related U.S. Application Data

(60) Provisional application No. 63/046,405, filed on Jun. 30, 2020.

(51) Int. Cl.
*H04L 9/40* (2022.01)
*G06F 16/24* (2019.01)

(52) U.S. Cl.
CPC .......... *H04L 63/1433* (2013.01); *G06F 16/24* (2019.01)

(58) Field of Classification Search
CPC .. H04L 63/1433; H04L 63/1425; G05F 16/24
See application file for complete search history.

(56) References Cited

U.S. PATENT DOCUMENTS

| 137,257 | A | 3/1873 | Stillman et al. |
| 9,166,999 | B1 * | 10/2015 | Kulkarni ................. G06F 21/31 |
| 9,338,137 | B1 * | 5/2016 | Fedko ................... H04W 76/12 |
| 9,680,864 | B2 * | 6/2017 | Khesin ................ H04W 12/128 |
| 11,159,546 | B1 * | 10/2021 | Moore ................ H04L 63/1466 |
| 11,316,883 | B2 * | 4/2022 | Sbandi ................ H04L 63/1416 |

(Continued)

FOREIGN PATENT DOCUMENTS

| CN | 114978614 A | * | 8/2022 | |
| FR | 3094600 A1 | * | 10/2020 | ........... G06F 21/552 |
| WO | WO-2021222199 A1 | * | 11/2021 | ............. G06F 21/55 |

*Primary Examiner* — Sarah Su
(74) *Attorney, Agent, or Firm* — Alston & Bird LLP (57) ABSTRACT

A method of cybersecurity performance analyzing for customer site(s) including assets in a networked system including different asset types, and a virtual security engine (VSE) server. The customer site is coupled to a Security Center (SC) including a SC server, and a cybersecurity hardening compliance engine (CHCE). The VSE server collects identification data and security configuration data from the asset types, and transfers the data to a SC database. Responsive to a user request to generate a cybersecurity hardening compliance report, the CHCE sends a query to the SC database to retrieve at least a portion of the data, uploads a cybersecurity benchmark including cybersecurity configuration rules (CCRs) for least a selected asset type, compares the data of the assets to the CCRs, and generates from results of the comparing a cybersecurity report including a quantitative measure of cybersecurity performance for the assets of the selected asset type.

20 Claims, 7 Drawing Sheets

(56) References Cited

U.S. PATENT DOCUMENTS

| | | | |
|---|---|---|---|
| 2016/0072831 A1* | 3/2016 | Rieke | H04L 63/1433 |
| | | | 726/1 |
| 2019/0207907 A1* | 7/2019 | Savintsev | H04L 63/1441 |
| 2019/0354881 A1* | 11/2019 | Rosler | G06N 20/00 |
| 2020/0236129 A1* | 7/2020 | Barkovic | H04L 43/045 |
| 2020/0259846 A1* | 8/2020 | Okano | H04L 63/1425 |
| 2021/0021636 A1* | 1/2021 | Sbandi | H04L 63/1466 |
| 2022/0337603 A1* | 10/2022 | Shah | H04L 63/102 |

* cited by examiner

CYBERSECURITY COMPLIANCE ENGINE FOR NETWORKED SYSTEMS

CROSS REFERENCE TO RELATED APPLICATIONS

This application claims the benefit of Provisional Application Ser. No. 63/046,405 entitled "CYBERSECURITY COMPLIANCE ENGINE FOR NETWORKED SYSTEMS", filed on Jun. 30, 2020, which is herein incorporated by reference in its entirety.

FIELD

Disclosed aspects relate to cybersecurity for networked systems.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize cybersecurity hardening is the process of securing a networked system by reducing its surface vulnerability, through adjusting the networked system cybersecurity rules (also known as settings or policies) according to defined security requirements generally obtained from a publicly available cybersecurity hardening baseline or cybersecurity hardening standard. Networked systems are known to be more cybersecure when they perform fewer functions. A cybersecurity hardening baseline contains a group of cybersecurity rules, which should be applied to the respective system assets to comply with the cybersecurity hardening standard. Usually, each rule also includes an audit for checking if that rule was applied to the assets, and a remediation action if it is determined to be needed to establish the recommended rules.

Disclosed aspects include a cybersecurity hardening compliance engine (CHCE) that can be within a Security Center (SC), which provides a security service that allows a user (typically the information technology (IT) system administrator) of a customer to calculate a quantitative measure of cybersecurity compliance (such as from 0% to 100%) for the respective assets (e.g., Microsoft WINDOWS assets, Cisco assets, or other assets) in the customer site(s). The customer site(s) include a Virtual Security Engine (VSE) server used for collecting site data comprising identification data and security configuration data from its respective assets, then providing the identification data and security configuration data to the SC. The VSE server can be used for asset management at the site level, while the SC can be used for asset management at an enterprise level of the customer' site. The collected identification data and security configuration data provided by the VSE server to the SC is stored in a SC database, that is queried by the CHCE during its operation. In another disclosed arrangement, the VSE server, itself, implements a disclosed CHCE stored in its associated memory, alleviating the need for an SC.

The CHCE identifies the assets in a customer's networked system, identifies the respective asset types (such as routers, switches, firewalls or WINDOWS computers), operating system (OS) such as one or more WINDOWS OS in the case of computers, or the operating system for other assets, such as in the case of a Cisco Switch, its Internetwork Operating System (IOS) operating system, the OS version, and the assets' role, such as in the case of computers at the customer site, a domain controller, or an EXPERION Server. An EXPERION server is a Honeywell International product that uses a Distributed System Architecture (DSA) to support enhanced decision-making processes by providing, essentially instant access across the site, to live updates of EXPERION custom graphics and trends.

The SC will collect the needed identification data and security configuration data regarding the assets of the customer site from the VSE server, and the CHCE will calculate their compliance to a hardening standard that is utilized in the networked system. The asset identification data and security configuration data, includes examples provided by a group policy object (GPO) Hypertext Markup Language (HTML) REPORT, and a Cisco show command output.

Disclosed aspects include a method of cybersecurity performance analysis for customer site(s), including a plurality of assets in a networked system including different asset types, and a VSE server. The customer site is coupled to a SC including an SC server and a CHCE. The VSE server collects identification data and security configuration data from the respective asset types, and transfers the collected identification data and security configuration data to a SC database. Responsive to a user request to generate a cybersecurity hardening compliance report, the CHCE sends a query to the SC database to retrieve at least a portion of the identification data and security configuration data, uploads a cybersecurity benchmark including cybersecurity configuration rules (CCRs) for least a selected asset type, and compares the identification data and security configuration to the CCRs. The CHCE then calculates, from results of the comparing, a cybersecurity report including a quantitative measure of cybersecurity performance for the assets of at least one selected asset type.

In accordance with a determination that a security configuration for any of the assets fails to meet at least one of its cybersecurity benchmarks, an alert may be generated and/or corrective action can be automatically implemented. For example, a Message notification or an email notification. As noted above, disclosed arrangements also include the VSE server, itself, implementing a disclosed CHCE stored in its associated memory.

DETAILED DESCRIPTION

Disclosed aspects are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed aspects.

Figure 1:
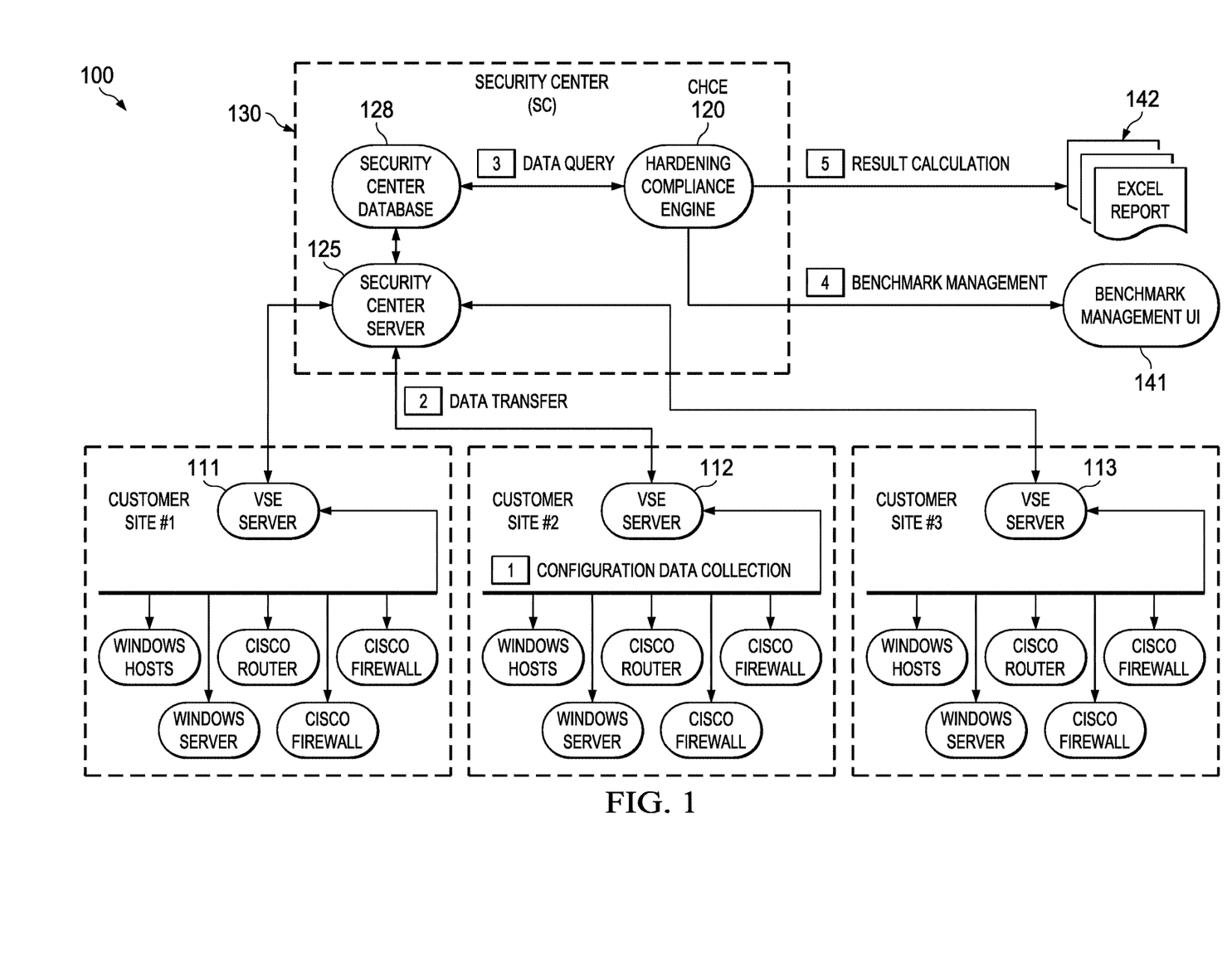
FIG. 1 shows an example network system architecture that includes a disclosed CHCE coupled to a plurality of customer sites each including a VSE service node(s) shown as a VSE server, the customer sites being shown as customer site #1, site #2, and site #3, according to an example aspect.

FIG. 1 shows the architecture of an example networked system 100 that includes a disclosed CHCE 120 in a location labeled the SC 130 having a SC server 125 communicably coupled to a plurality of customer sites each including a VSE server, the customer sites being shown as site #1, site #2, and site #3, according to an example aspect. The CHCE 120 resides on a server shown as a SC server 125 that is coupled to access the SC database 128, which stores collected identification data and security configuration data received from the VSE servers 111, 112, 113.

As noted above, the VSE servers 111-113 provide collected data from their associated customer site to the SC 130, and provide asset management at the site level, while the SC 130 provides asset management at an enterprise level of the customer site. The collected identification data and security configuration data queried by the CHCE 120 is stored in the SC database 128.

Currently, in order to determine the cybersecurity compliance of a networked system with a cybersecurity hardening standard, a user needs to manually log into each of the assets to be examined for cybersecurity compliance. One example cybersecurity hardening benchmark is made publicly available by the Center for Internet Security (CIS), which can be used to provide the CCRs, also known as settings or policies, including for disclosed aspects, and to check the relevant WINDOWS registry value for each CCR. If available, an automatic test script should be generally installed on the respective assets.

Scripts are known to be a special type of file, such as Microsoft POWERSHELL scripts. For example, using a Product Line (PL), which is a set of definitions and scripts that direct how and what data to collect. The WINDOWS Supplemental PL or Cisco Device PL can be used, where a PL is set of scripts that collect data from the asset. WINDOWS Supplement PL's collect data from a WINDOWS machine and Cisco PL's collect data from a Cisco Machine.

Conventionally, the user may be required to manually execute a script and generate a report on the local machine (e.g., computer on a local machine and for a switch and a router to configure). Generating a single report with all the assets' cyber hardening information without configuring all the asset information is not conventionally supported.

In one disclosed aspect, the CHCE can generate a cybersecurity hardening report for each of the monitored customer site(s), the report containing the cybersecurity compliance result for each rule and the overall compliance percentage for each of the customers sites' assets. The cybersecurity report generated by the CHCE may include a quantitative cybersecurity hardening compliance result for the assets of at least one selected asset type, a selected subset of the asset types at a customer site, or for all of the asset types at the customer site. The cybersecurity report can be generated at any time using a task scheduler, which can schedule the generation of reports at one or more predetermined times, or on demand.

The CHCE 120 is an agentless system that enables customers to calculate a cybersecurity compliance as noted above generally expressed as a percentage, such as 0% to 100%, for each asset in its networked system. Compared to known cybersecurity solutions, there is no need for the customer to install a software-based agent on the assets in its networked system to compute the cybersecurity compliance for the assets. Additionally, disclosed aspects overcome the need to manually append asset information to the CHCE.

In another disclosed aspect, the CHCE optionally allows customization of cybersecurity benchmarks according to a particular customer requirement and application of the customized benchmarks to the customer's network. For example, a user can modify the default set of CCR's in the benchmark and create a new baseline, the customer can build a new baseline by activating (enabling) or deactivating (disabling) rules, or changing the CCR's title. As an example, the rule in a WINDOWS benchmark titled "Ensure 'Enforce password history is set to' 24 or more password(s)'", where "24" is a required variable by the benchmark, may be changed by a user with the CHCE to any other positive integer. Further, the CHCE makes enables editing rules parameters/thresholds. Known cybersecurity solutions generally allow only activating (enabling) or deactivating (disabling) CCR's.

In one disclosed aspect, the CHCE enables binding each cybersecurity benchmark, or customization thereof, to a specific asset, site, or globally over a networked system. The CHCE can also optionally support a labeling mechanism, enabling a user to bind CCR's of a benchmark to any asset group, regardless the group asset type. For example, one label may be "sales" representing the sales group for a given customer. In this example the sales group can contain multiple associated asset types. The difference in this disclosed aspect is allowing users to apply CCR's of a cybersecurity benchmark over a known asset property, such as their site automatically. In one version, it is possible to apply new cybersecurity benchmark over a plurality of customer sites or globally over the system. A default benchmark can be used if no new relevant cybersecurity benchmark was found to be applied. A manual labeling mechanism can also be provided, so that the user will be able to assign an asset to a label, and a label to a cybersecurity benchmark.

Accordingly, label accords inspection of a selected subset of assets compliance with a chosen set of cybersecurity benchmarks. The labeling mechanism thus enables a customer to choose any asset group he or she would like, and then assign them to a cybersecurity benchmark marked with the same label.

According to one disclosed aspect, the networked system 100 including the CHCE 120 operates as follows, shown as step 1-5 in FIG. 1 and described below. While listed as steps, it will be understood that each step need not occur in the order shown and/or may be performed in parallel with other steps.

Step 1. Each VSE server 111, 112, 113 collects over a suitable network identification data and security configuration data from the assets in its respective customer site (computers, servers, routers, switches, and firewalls). Collection of this data may be implemented, for example, using WINDOWS supplemental PL or a Cisco device PL. For example each customer site is shown having assets being WINDOWS hosts, a WINDOWS server, a Cisco router, and 2 Cisco firewalls.

Step 2. The collected identification data and security configuration data is transferred from the customer site(s) shown as customer sites #1, #2, and #3 to the SC server 125. The data transfer may occur at predefined intervals or car on-demand.

Step 3. Upon a user (e.g., an IT administrator) request to generate a hardening compliance report, the CHCE 120 sends a query to the SC database 128 to retrieve at least a portion of the identification data and security configuration data. The frequency at which the CHCE 120 retrieves this data from the SC database 128 may be less than the frequency at which the VSE servers 111-113 transfer data to the SC server 125, for example, once a week vs. once a day.

Step 4. The customer, optionally, manages its benchmark repository (see the benchmarks repository shown as 120*b* in FIG. 2 described below) including uploading, deleting, or modifying one or more cybersecurity benchmarks. FIG. 1 shows the results of benchmark management being a benchmark management UI 141. Also, it is also possible to attach a benchmark to an asset group with the labeling mechanism, described in more detail below.

Step 5. A hardening report is generated for at least one asset type show by example as EXCEL reports 142. The CHCE 120 will try to identify the asset, based on entries in the SC database 128. After the asset is identified, the CHCE will query the SC database 128 for the identification data and security configuration data, such as a GPO report for WINDOWS devices and "show command" output for Cisco devices.

The site includes data relevant for identifying the assets and the actual CCRs that help to collect the information, such as identifying information comprising the vendor, type, version and role (EXPERION (EPKS) Server, EPKS Station, and domain controller. For each asset the CHCE 120 then checks whether it meets the hardening requirements in the cybersecurity benchmark defined by the plurality of CCR's. The CHCE 120 performs a calculation on the identification data and security configuration data to generate a cybersecurity report that includes a quantitative measure of cybersecurity performance for the respective assets, such as in the form of an EXCEL report.

The SC 130 shown in FIG. 1 is located at a company's headquarters and the VSE Service Node(s), shown as VSE servers 111-113, where the SC 120 and the VSE servers 111-113 are both installed in each of the customer sites. The SC server 125 enables operational technology (OT) security personnel to centrally define their CCRs, distribute and deploy them to the VSE servers 111-113 at the respective remote customer sites, together with other rules for monitoring and reporting. The VSE servers 111-113 or other VSE service nodes connect to the assets on the network, such as a SCADA/industrial control system (ICS) network, including workstations, network devices, PLCs, and other proprietary equipment, such as for monitoring and enforcing its security.

Once the networked system is configured with the CCRs, it runs automatically, delivering continuous visibility across all customer site(s), along with alerts on security vulnerabilities and compliance issues. The SC 130 and the VSE servers 111-113 can be connected via an ICS SHIELD which is a secure 'tunnel' provided by Honeywell International, that comprises OT cybersecurity management platform for securing connected industrial control system (ICS) environments. The ICS SHIELD provides a single, outbound-only, remote connection providing complete security, equivalent to the security of a "data diode," but with the additional benefits of bi-directional communication.

Figure 2:
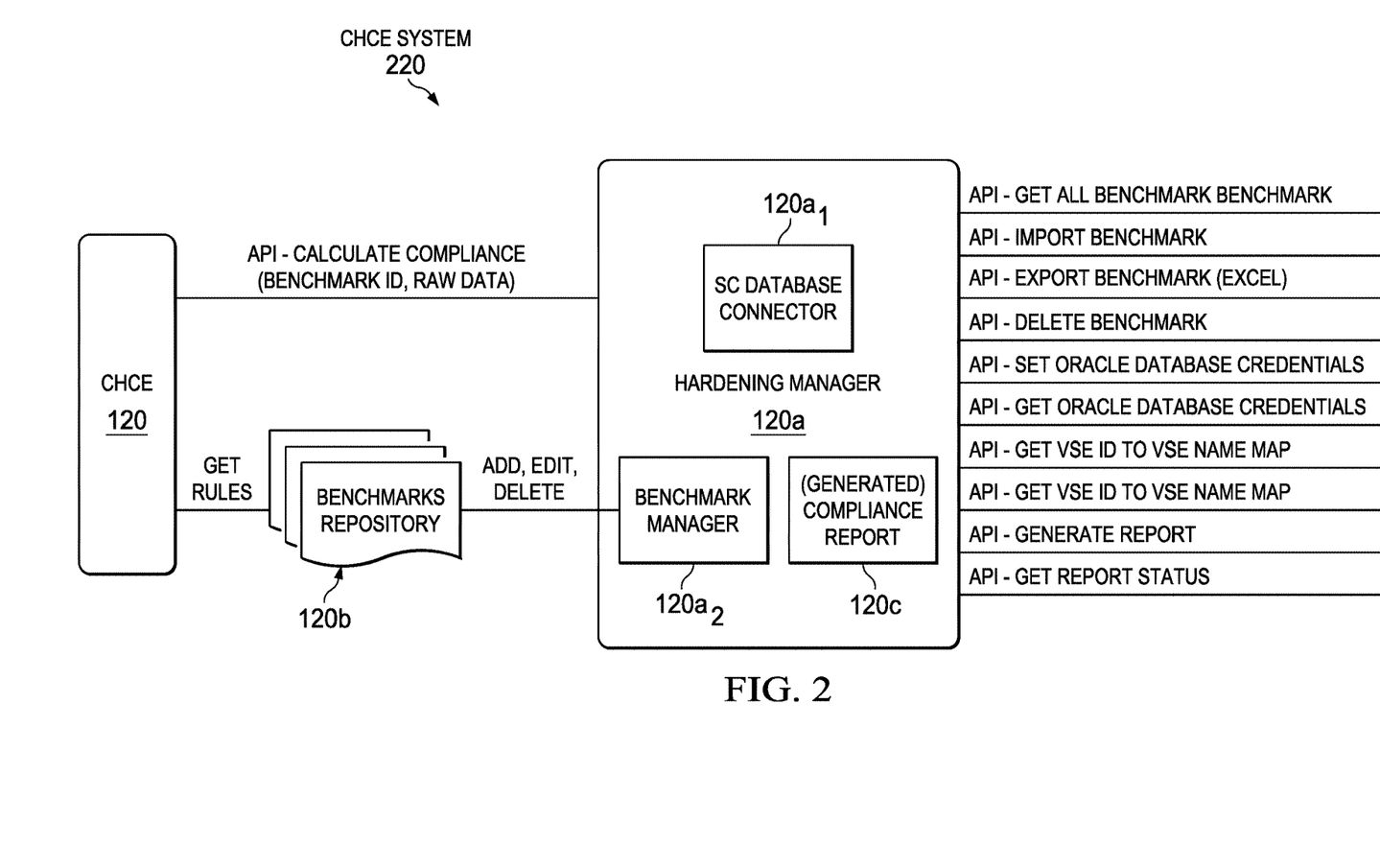
FIG. 2 shows the CHCE shown in FIG. 1 now including a hardening manager, according to an example aspect.

Referring now to FIG. 2 the CHCE 120 shown in FIG. 1 is now shown as CHCE system 220 including the CHCE 120, the CHCE system 220 further including a hardening compliance manager (hardening manager) 120*a* that can be a microservice application, and also a benchmarks repository 120*b* that stores a plurality of different cybersecurity benchmarks shown including a "get rules" input from the CHCE 120. The hardening manager 120*a* is also shown calculating a compliance (from the benchmark ID and raw data), including generating a compliance report 120*c* that may include the following two components shown in FIG. 2:

Hardening assets information and data crawler (information/data received from the SC Database 128 shown in FIG. 1) shown received using the SC database connector 120*ai* in FIG. 2. The SC database connector 120*ai* is part of the hardening manager 120*a*. The is SC database connector 120*ai* is dependent on the SC database 128 shown in FIG. 1. When a report generation request is received, the CHCE system 220 can implement the following sequence of steps that includes querying the SC database 128 for all the sites under the SC 130.

1. If the customer specifies a specific site list, the most recent list can become part of the compliance report 120*c*, where the compliance report can be generated only for the specified sites.

2. For each site:

a. For each device:
   Query the SC database 128 for the device properties: vendor, model, version, build, and role.
   Query the SC database 128 for device' raw data according to the device properties, which upon them a hardening compliance will be calculated, to enable generating a hardening.
   Query the Benchmark manager 120*a*2 for which benchmark, the hardening calculation should utilize. Calculate the hardening compliance, with the hardening manager 120*a*.

b. Generate a compliance report 120*c* for all the devices on the site.

Regarding the hardening manager 120*a*, the hardening manager 120*a* allows importing, modifying, and re-applying benchmarks to each combination of vendor, type, version, and role; for example, asset type, of various types on each vendor OS version and for each role. For example, an EXPERION Server from Honeywell International operating on Microsoft WINDOWS 2016.

The settings contained in the benchmarks which can be in the form of a .zip file can include the initial factory default settings, which can be applied to all devices that share the same combination disclosed above (e.g., vendor, type, version, and role). On Demand the hardening manager 120*a* can export these settings to an external EXCEL file, modify these settings, and then re-import the modified file and apply the modified benchmarks to all or to specific sites, as described in the following sections.

2. The benchmarks repository 120*b* is shown making modifications to the rules obtained from the CHCE 120 shown as add, edit, delete before providing them to the benchmark manager 120*a*2.

The hardening manager 120*a* is generally a microservice which has a primary purpose is to calculate hardening compliance for the respective devices in the site(s). The hardening manager 120*a* can operate to expose one GRPC API, "calculate a device's compliance" which received a benchmark path, and device's raw data, and returns a compliance result for that device.

In the Hardening manager 120*a* is generally implemented multiple "Parsers". Each Parser can handle different raw data input, decipher it and prepare it for the rules examination step. For example, WindowsGPOParser, can parse the Windows GPO report in HTML format. Each benchmark indicates what parser should be used, in order to decipher it. When the raw data is in the correct format, the raw data is compared to the rule parameter and condition. After all the rules were compared, the compliance report 120*c* result will be returned.

The hardening manager 120*a* as described above calculates cybersecurity compliance.

as INPUTs: the Benchmark path, parser, and raw data
as an OUTPUT: benchmark result.

The hardening manager 120*a* calculation can be implemented as follows.

1. The VSE server (see FIG. 1) collects data from the respective assets (computers, servers and stations) that can operate by using Windows Supplemental Product Line and Cisco Device Product Line, either as a stand-alone or installed on a station server.
2. The collected data is transferred by the VSE server on predefined intervals to the SC 130.

Upon request to generate a hardening compliance report 120*c*, the hardening manager 120*a* sends a query to the SC database 128 to retrieve the raw data. The hardening compliance report 120*c* can be either scheduled or generated on-demand. The parameters relevant for identifying the device and the actual configuration and security settings that help in the collection of information (data), for example can comprise for each device at the site as described above:

Vendor
Model
Version
Role—for example Experion (EPKS) Server, EPKS Station, and domain controller.

3. For each product, the hardening manager 120*a* checks whether it meets the hardening requirements.
4. The hardening manager 120*a* performs a calculation on the collected data and creates a hardware compliance report 120*c* can be in the form of an EXCEL report.

Figure 3:
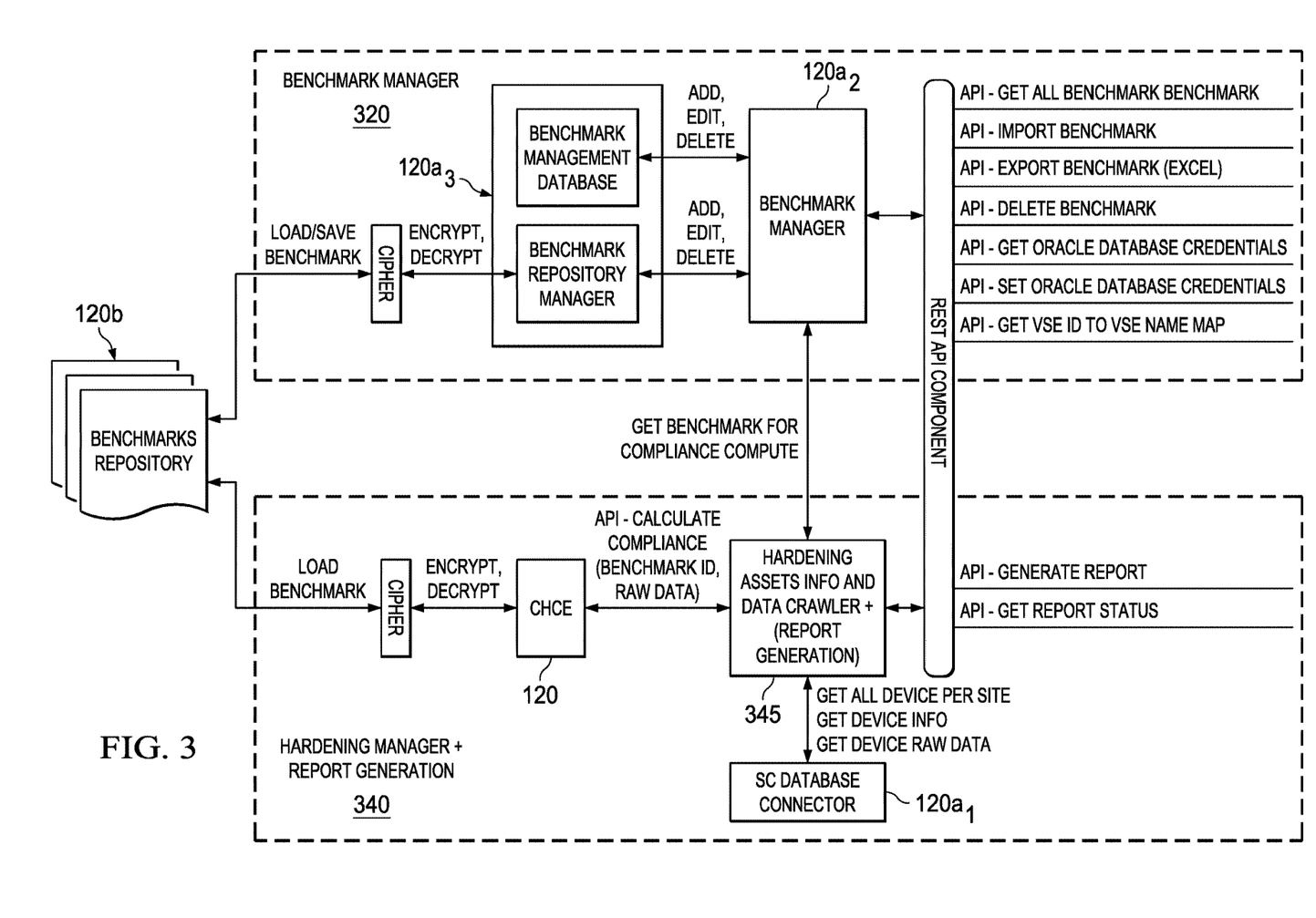
FIG. 3 shows an example how a disclosed benchmark manager may be interfaced, according to an example aspect.

FIG. 3 shows the benchmark manager 120*a*2 in FIG. 2 now as 320 further including a benchmark manager 120*a*3 that may be interfaced. The benchmark manager 320 is shown interfaced to a hardening manager 340 that is also used for report generation. The hardening manager 340 is shown including a CHCE 120 that is coupled to a hardening assets information and data crawler 345. The benchmark manager controller 120*a*3 enables a customer to do the following example actions:

1. Upload a new cybersecurity benchmark obtained from the benchmarks repository 120*b*,
2. Edit the SC database's 128 stored IP addresses and credentials,
3. Apply cybersecurity benchmarks to each of the asset types, and
4. Edit the cybersecurity benchmark rules, including for example:

Changing parameters of the cybersecurity benchmark rules,
Changing the title of the cybersecurity benchmark rules,
Disable or enable a cybersecurity benchmark rule, so that in the case of enabling the rule can be calculated as part of the hardening compliance result. The Benchmark Manager: 120*a*2 is a component that allows the customer to do the following:

1. Upload a new benchmark.
2. Edit SC database 128 IP address and credentials.
3. Apply benchmark to a devices group.
4. Edit the benchmark rules received from the benchmarks repository 120*b*, including Change rules parameters
Change rules title
Disable or enable a rule, so the rule will be calculated as part of the device hardening compliance result.

For each benchmark, there are multiple properties which indicate which device this benchmark will be applied, generally including:

Vendor
Type
Version
Role—for example EPKS (Experion) Server, EPKS Station, and domain controller. This property isn't related to the benchmark itself and could be empty and can also be applied over hosts without a specified role.
Entity—indicating upon which devices group will be applied. at the first release. This information is generally limited only to a site on the first release.

Regarding the Hardening compliance Report that is generated by the benchmark manager 120*a*2

1. For each asset type, the CHCE 120 takes the parameters relevant for identifying the device and the actual configuration and security settings that help to collect the information, such as: Vendor, Type, Version and Role (Experion (EPKS) Server, EPKS Station, and domain controller).
2. For each product, the CHCE 120 checks whether it meets the hardening requirements.
3. The engine performs a calculation on the collected data and creates an Excel report.

Regarding the Benchmark Repository Management API that is relevant to API Component can implement the following:

Get All Benchmarks:
OUTPUT: Return Benchmark Map Table (UUID, Hardening Standard, Vendor, Model, Version, Build, Role, Type, VSE Name, Last Update) without a Benchmark Path.
Download Benchmark Format:
INPUT:
Get From API UUID of relevant benchmark
Search In Benchmark Table the benchmark type by Its uuid
Convert to Excel file
OUTPUT:
Return (Download) benchmark Excel
Upload Custom Benchmark:
INPUT:
1. Get From API and Excel File, Site IDs Array and type (custom, default, global), If the Site ID array was provided, Type should generally be custom.
2. Parse the Benchmark file that is generally in an Excel format
3. Search exact match of (Hardening Standard, Vendor, Model, Version, Build, Role, Benchmark Path, Site ID/Global) in "Benchmark Map Table"
    a. if not exist-continue
    b. else
        i. get uuid
        ii. remove row entry by uuid from "Site" Table
        iii. remove row entry from "Benchmarks" table
4. Merge rule from default and from Excel file—By changing args value.
5. Create UUID for benchmark—attach It to file.
6. Store benchmark in repository.
7. Add benchmark to Database (Benchmarks, Entities).

OUTPUT:
Return message+HTTP Code
Upload Public Benchmarks:
INPUT:
Get From the API a Public Benchmark zip file.
Extract the zip file.
For each new public file:
   Check if identical public file exist in public benchmark repository (CRC Comparison)
   If exist, skip to next public benchmark
   Merge Public Benchmark
OUTPUT: Return message+HTTP Code
the new public file will generate new default benchmark. In case custom benchmark was already created, the exist custom benchmark will not be affected.
Delete Benchmark
INPUT:
Get From the API Benchmark UUID
Validate this benchmark isn't default
Remove from all tables
Regenerate a "Benchmark Mapper" Table
OUTPUT:
Return message along with HTTP Code
Get Database Credentials for this example being an Oracle
OUTPUT: Oracle Username, Oracle Port, Oracle Hostname
Set Oracle Database Credentials:
Input: Oracle Username, Oracle Password, Oracle Port, Oracle Hostname
Get VSE ID To VSE Name Mapping:
Output: can be Json Mapping VSE ID to VSE Name As noted above, the user can download the cybersecurity benchmarks in an EXCEL format. For each cybersecurity benchmark, there may be multiple properties for each asset to which the given benchmark may be applied, such as vendor, type, and version. The role can comprise an EPKS (Experion) Server, EPKS Station, or a domain controller. This property is not related to the benchmark itself and can be empty (and can be applied over hosts without a specified role). The entity indicates upon which asset type will be applied, which may be limited only to a customer site.

Some other features include a benchmark edit through the UI instead of via an EXCEL based benchmark. Schedule reports generation from the UI. Download Report directly from the UI. View result from the UI.

Build number is usually assigned to complied software. "Build" number can be used as a property for benchmarks, for example multiple versions of WINDOWS 10 benchmark can be supported: such as 11507, 1607, 1709, 1809, etc. Different benchmarks can be applied to different products, based on their build number. For example, the benchmark for WINDOWS 10 version 1809, can be slightly different from the benchmark for WINDOWS 1709.

More roles can be supported. Moreover, more entity types can be supported, such as asset tagging.

Figure 4:
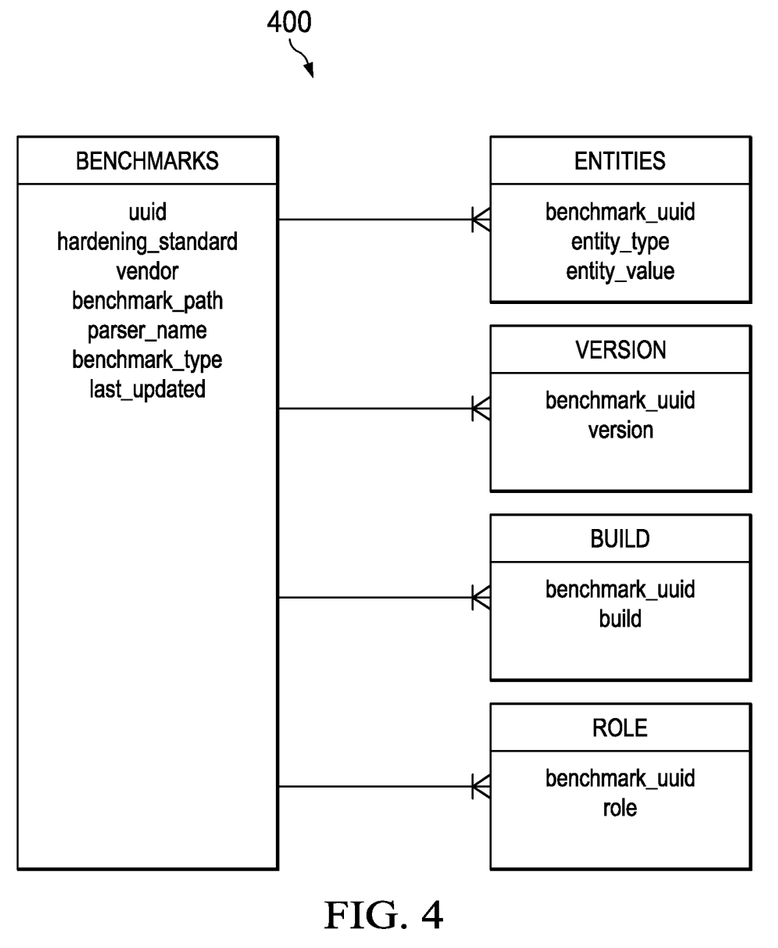
FIG. 4 shows example benchmark repository management entity relationships, according to an example aspect.

FIG. 4 shows example benchmark repository management entity relationships 400, according to an example aspect. included in the benchmarks are shown as entities, version, build and role. An example implementation can use a SQlite built-in python package with sqlalchemy package, where SQlite can be on a memory basis.

Regarding assets information and data crawler and report generation, this component can be part of the hardening manager microservice. This component is dependent on the SC database 128 and may be integrated into SC 130 in the future. When a report generation request is received the following sequence of events can occur:

1. Query the database for all the sites under the SC.
2. If the customer specifies a site list which will be part of the hardening compliance report, the report will be generated only for these customer sites.
3. For each customer site:
   a. For each asset:
      i. Query the SC database 128 for asset properties, such as vendor, model, version, build, and role,
      ii. Query the SC database 128 for identification data and security configuration data for the assets' data according to the assets' properties, which upon them a cybersecurity hardening compliance percentage (0 to 100%) will be calculated,
      iii. Query Hardening Benchmark management, for which benchmark, the hardening calculation should occur, and
      iv. Calculate Hardening Compliance, such as using a Hardening Engine microservice.
   b. Generate a report for all the assets for the supported asset types on the customer site.

Regarding choosing a benchmark file, asset properties keys can include a hardening standard, a vendor, a model, and/or a version. Build and role are generally optional. One can generally query a "Benchmark Map Table" view with the asset's properties. A specific Example is shown below: The benchmark file will generally be selected according to device, vendor (Cisco, Microsoft, etc.), model=type (switch, router, firewall . . . ), and version. A more specific benchmark file will generally be chosen in the case a role or build number exists. For example, for a WINDOWS server 2019 machine which functions as domain controller can be calculated according to benchmark "WINDOWS server 2019 domain controller" instead of the benchmark "WINDOWS server 2019").

SELECT*
FROM benchmark_mapper_view
WHERE hardening standard="custom_honeywell"
AND vendor="microsoft"
AND model="windows"
AND version="server 2016"
AND entity_type="site"
AND entity_value="vse-8"
OR type IN "default", "global".

In addition to the asset key, a hardening calculation request can contain the asset's site id. The result of the SQL Query can include the number of matches. Regarding benchmark priorities, to determine which benchmarks will be selected, the determination can be:
   a. Site-specific—if request received with an entity of site and there is a line fully match to: hardening standard, vendor, model, version, build, role, entity_type="site", benchmark_type="customsite", entity_value, the benchmark at this line will be selected.
   b. System default—if request received with entity of site and there is a line fully match to: hardening standard, vendor, model, version, build, role, benchmark_type="global"—the benchmark at this line will be selected.
   c. Factory Default—if request received with entity of site and there is a line fully match to: hardening standard, vendor, model, version, build, role, benchmark_type="default"—the benchmark at this line will be selected.
   d. An error will be raised, such as "No benchmark was found".

A single SQL query can be implemented to get that result.

Regarding the CHCE 120, it can be a microservice where its primary purpose is to calculate cybersecurity hardening compliance for the respective assets. The microservice can expose one GRPC API, "Calculate Device's Compliance" which receives a benchmark path, and assets' identification data and security configuration data, and return compliance results for that asset. The CHCE may implement multiple "Parsers". Each Parser can handle different collected identification data and security configuration data input, decipher the data and prepare it for rules examination step. For Example, WindowsGPOParser, parses the Windows GPO report in HTML format. Each benchmark indicates what parser should be used, in order to decipher it. When the identification data and security configuration data is in the correct format, the data is compared to the rule parameter and condition. After all the CCR's are compared, the cybersecurity hardening compliance result as a percentage from 0 to 100 as described above will be returned.

The CHCE 120 is an internal microservice, therefore, its API is internal, and based on gRPC.

The capabilities of a CHCE API can include the ability to:
Calculate Compliance:
INPUT: Benchmark path, parser, and collected data,
OUTPUT: a Benchmark Result.
Data Collection can comprise:
collecting configuration data on WINDOWS machines. The following configuration data is generally collected on WINDOWS machines:
OS information—can be sent to the SC in a raw format;
GPO data—can be saved as an HTML, file that is then automatically sent to SC;
When a cybersecurity compliance report is requested, both OS information and GPO data can be retrieved from the SC database, in order to perform the hardening compliance calculation. Successful generation of the compliance report will only take place if the execution profiles mentioned above are run successfully and the data is transferred to the SC.

Regarding data collection on Cisco machines, the disclosed cybersecurity hardening solution will query the SC database for the most recent collected identification data and security configuration data. This most recent collected identification data and security configuration data is used to perform the calculating to enable the generation of a disclosed cybersecurity hardening report. Cisco configuration data for example can be saved as text files that are then automatically sent to the SC. When a compliance report is requested, both OS information and Cisco configuration data can be retrieved from the SC database 128, in order to perform the hardening compliance calculation and cybersecurity hardening report generation.

Figure 5:
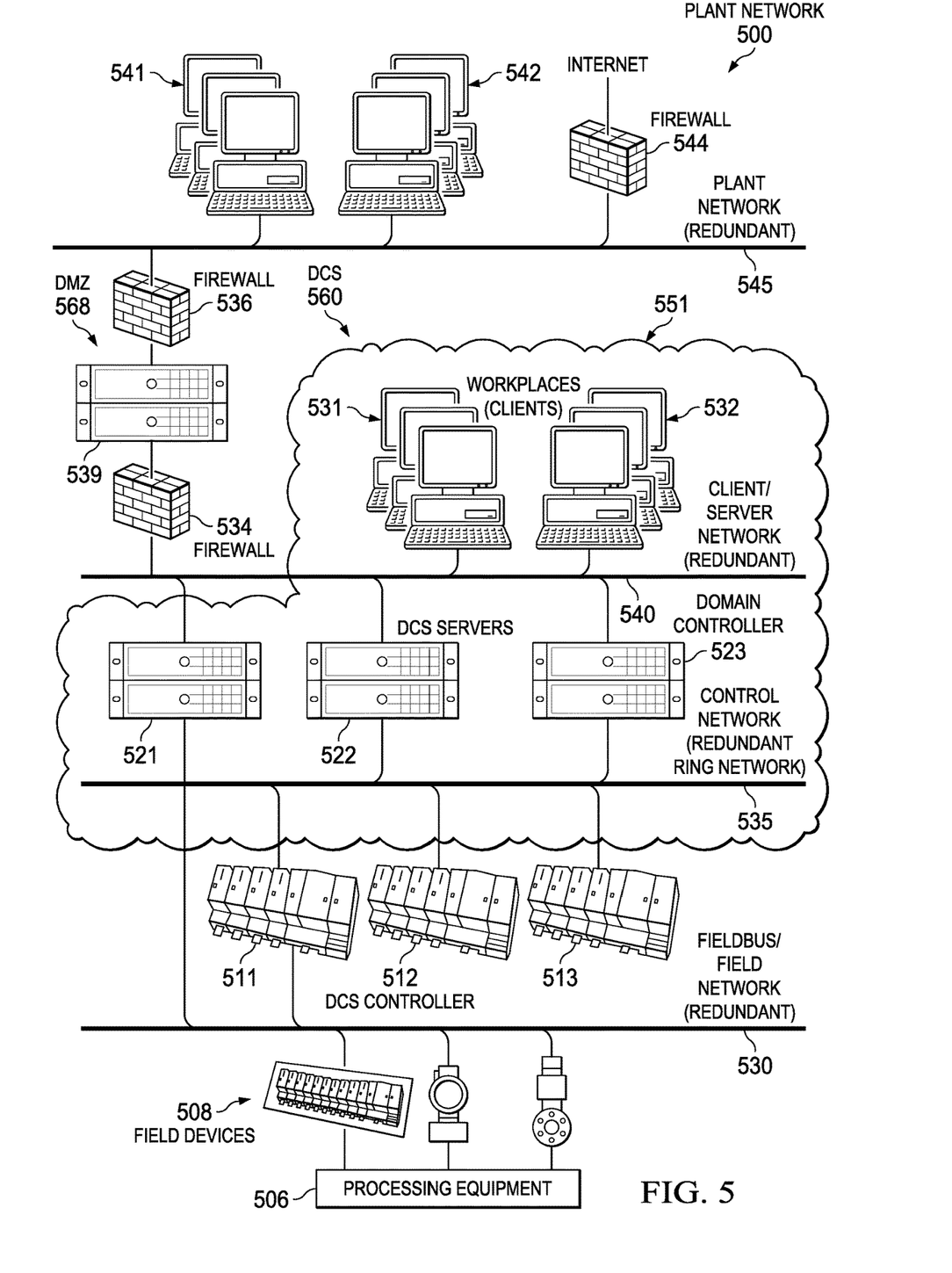
FIG. 5 shows an example plant network including a distributed control system (DCS) that includes network(s) with computers that can implement disclosed aspects.

FIG. 5 shows an example plant network 500 including a DCS 560 that includes a plurality of networks each including computers that can each implement disclosed aspects. The plant network 500 reflects a specific aspect of the more general customer sites shown in FIG. 1. FIG. 5 shows the different levels in the plant network 500. The plant network 500 is separated into different redundant network areas on different levels, shown as the fieldbus/field network 530, the control network 535, the client/server network 540, and a plant network 545.

As shown in FIG. 5, there is a boundary 551 depicted as a cloud, which indicates which computers in the DCS 560 that would at a minimum be hardened by a cybersecurity solution. The computers within the boundary 551 comprise DCS servers 521, 522 and 523, where DCS server 323 is identified as being the domain controller (DC). Within the boundary 551 is also workstations shown as 531 and 532. The DCS servers 521-523 are coupled to the workstations 531, 532 by a client/server network 340, such as comprising an Ethernet network.

The DCS 560 on its lowest level is shown including field devices 508 (such as sensors and actuators) that are coupled to processing equipment shown as 506. There is also a plurality of DCS controllers shown as 511, 512, and 513. The DCS controllers 511-513 are coupled to the DCS servers 521-523 by a network 535 that may also comprise an Ethernet network.

Besides the workstations 531, 532 in the demilitarized zone (DMZ) 368 shown, there are also firewalls 534 and 536, and another server 539. There is also shown client computers 541 and 542 that are coupled by a plant network 545 to the firewall 536. There is also a firewall 544 shown coupling the plant network 545 to the Internet.

The cybersecurity solution may be extended beyond the boundary 551, such as to also apply to computer systems in the DMZ 568. By cybersecurity hardening within the boundary 551 including the DCS servers 521 to -523, certain cybersecurity protections are extended to the lower levels since the DCS servers 321-323 interact directly with the DCS controllers 511-513. A cybersecurity compromised DCS server 521-523 puts the DCS controllers 511-313 and the field devices 508 directly at risk, and by extension cyberprotecting the DCS servers 521-523 also provides protections to DCS controllers 511-513.

In FIG. 5, the cloud depicting the bounds of the boundary 551 indicates which computer systems in one arrangement may be cybersecurity hardened by a disclosed cybersecurity solution. The cybersecurity solution may be extended to assets beyond the boundary 551, such as to also apply to computers in the DMZ 568. By cybersecurity hardening within the boundary 551 shown applied to the DCS servers 521-523, certain protections are extended to the lower levels (i.e., control network 535, etc.) since the DCS equipment interacts directly with the control devices/PLCs. This is because as noted above a compromised DCS server puts the DCS controllers 511-513 and field devices 508 directly at risk.

Figure 6:
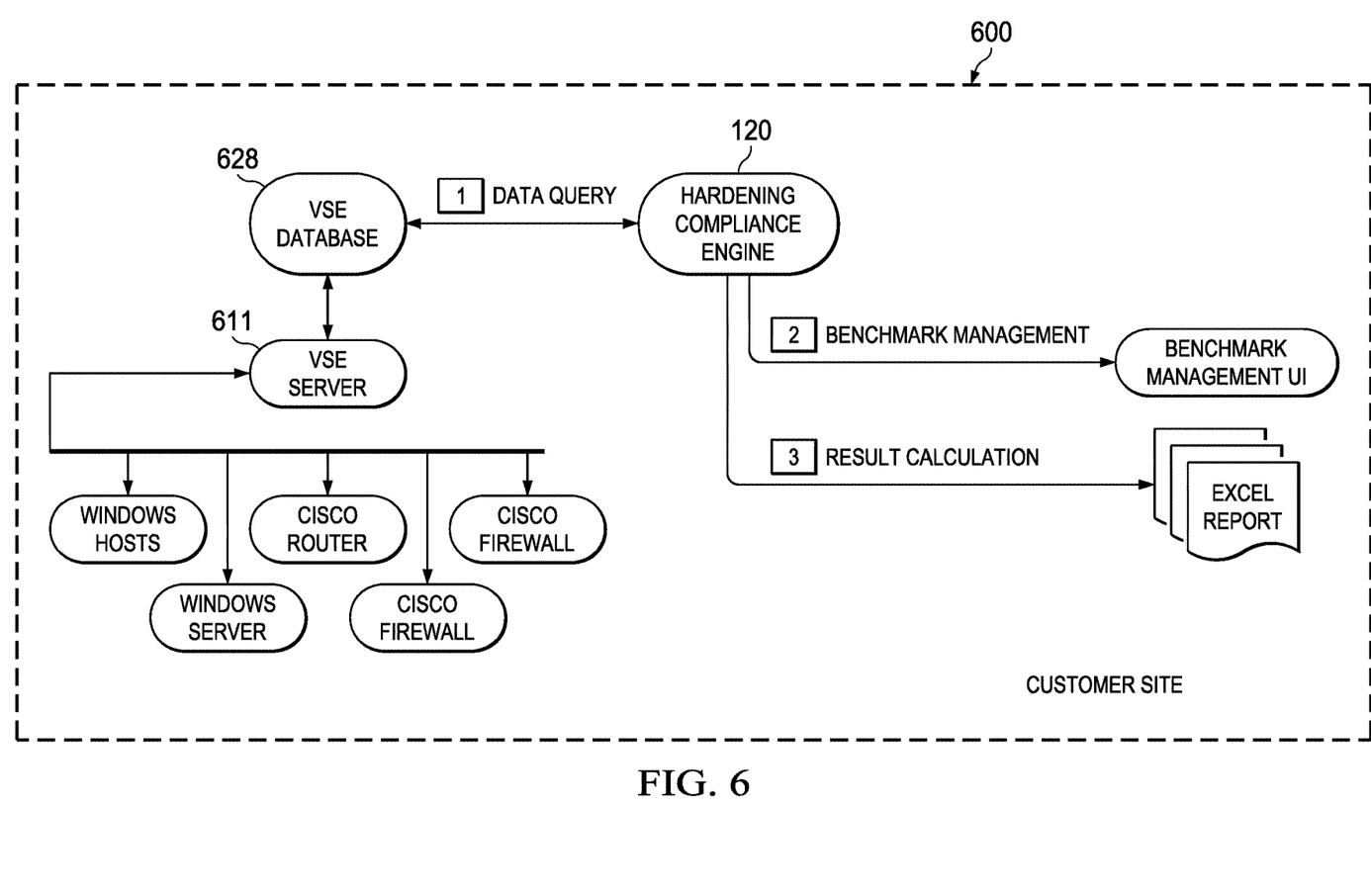
FIG. 6 shows an example network system architecture that includes a disclosed CHCE at a customer site implemented by a VSE server that utilizes a VSE database, according to an example aspect.

Although the SC is generally described above being separate from the customer sites, as noted above, it is also possible for a disclosed CHCE 120 to be deployed at the site level by connecting it to a VSE database associated with the VSE server at the customer site. FIG. 6 shows an example network system architecture 600 that includes a disclosed CHCE 120 at a customer site implemented by a VSE server shown as 611 having an associated VSE database shown as 628, according to an example aspect. In this arrangement, responsive to a user request for a cybersecurity hardening report, the CHCE queries the VSE database that has the collected identification data and security configuration data, instead the SC database 128 as described above.

As described above, in accordance with a determination that the cybersecurity data for at least a first asset of the plurality of assets in the network fails to meet it cybersecurity benchmark, additional action may be automatically taken. Responsive to an indication that the cybersecurity data for at least a first asset of the plurality of assets fails to meet at least a portion of the cybersecurity benchmark, there can be an identification of the cybersecurity data parameter of the first asset that fails to meet its cybersecurity benchmark, and a recommendation to a change to the security configuration data for the first asset that, if implemented, would meet the cybersecurity benchmark for the first asset.

The method can also comprise for least a first asset for which the determining finds that the cybersecurity configuration data for the first asset fails to meet its cybersecurity benchmark, the method can include automatically changing the security configuration data for the first asset, wherein a change made in accordance with the changing of the security configuration data for the first asset that meets the cybersecurity benchmark.

Disclosed aspect also include cybersecurity system features for identifying cybersecurity issues including unauthorized cybersecurity system changes, including mitigation/remediation of any identified cybersecurity issue. It is recognized that there is no solution available in the today's market which provides an alert/notifies to customers in the case of deviation in the cybersecurity compliance of any of the assets in a networked system. This disclosed aspect comprises an agentless application with automated evaluation and control algorithm for non-compliant server security asset identification which identifies, analyzes and can also mitigate non-compliant cybersecurity policies for industrial control system infrastructure and networks of industrial control systems.

When an application or an operating system is installed with default cybersecurity settings, this can lead to cyber attackers breaching into the network because most of the cases new system deployed are not cybersecurity hardened or cybersecurity compliant. This disclosed aspect generally being a web-based application, such as being hosted on the Cloud which makes future cybersecurity software changes and upgrades easier to manage.

This disclosed application will generally be deployed in Level 3 of the network which monitors their infrastructure with respect to compliant settings/policies, analyzes to determine if any cybersecurity setting changes have taken place either authorized or unauthorized) and mitigate to meet hardening and compliant cybersecurity baseline settings, which can be customized settings, that can be active all the time to detect unauthorized settings or policy changes as essentially soon as any unauthorized settings or policy changes take place.

Processing facilities are often managed using industrial process control and automation systems. Control and Automation systems usually include a variety of networked devices such as servers, workstation, switches, routers, firewalls, safety systems, proprietary real-time controllers, industrial field devices and variety of software to run the smooth operation of the Process Plant such as Plant information management (PIM), Data Historians, Advanced Process Control (APC), Model-predictive control (MPC), Real-time process optimization (RPO), Process simulation and optimization (PSO), and Plant asset management (PAM) and Production management (MES). Generally, this equipment comes from several third-party vendors. In Industrial process control environments, cyber-compliance is recognized to be of increasing concern and unaddressed non-compliance in any of these components could be exploited by attackers to disrupt duster facility operations or cause unsafe conditions in an industrial facility. Therefore, it is recognized there is a need for an automated evaluation and control algorithm for healthy, hardened and cyber compliant Industrial control system Infrastructure.

Figure 7:
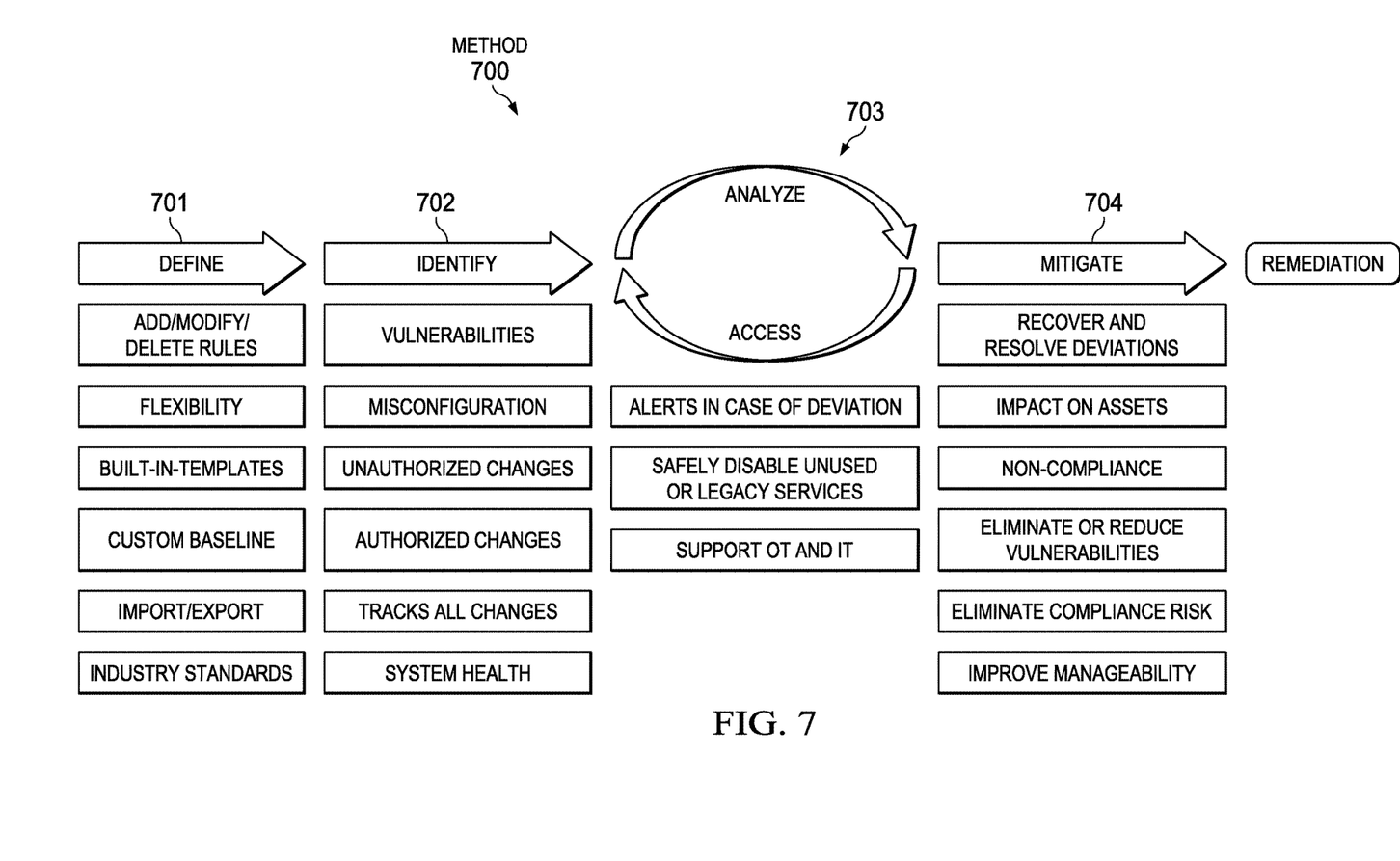
FIG. 7 shows a series of steps in a disclosed method of cybersecurity compliance management and mitigation.

FIG. 7 shows a series of steps in a disclosed method 700 of cybersecurity compliance management and mitigation that addresses this above-described recognized need. Step 701 comprises defining cybersecurity rules and settings. Step 702 comprises identifying cybersecurity issues, which includes identifying cybersecurity vulnerabilities, misconfigurations as well as unauthorized cybersecurity setting changes. For the identifying there is generally a data query for an algorithm engine to automatically collect cybersecurity data that can be initiated on-demand or be initiated from a schedule.

Any query generally collects currently configured cybersecurity data from the respective assets in the system. The cybersecurity data is generally collected from end-node equipment in the respective assets in the system, such as an industrial process control system (PCS), where the equipment can comprise WINDOWS machines switches routers, firewalls, LINUX machines, and software. The algorithm engine can optionally operate continuously for collecting the cybersecurity data for the respective assets in real-time.

Step 703 comprises analyzing and assessing including issuing of alerts in the case of a deviation identified at step 702. The analyzing generally comprises comparing the cybersecurity data obtained of the assets to requirements defined by a cybersecurity standard which can be a custom cybersecurity standard as per the site requirements. The analyzing is generally for identifying cybersecurity changes needed in the system by considering criticality, impact, risk score, and privileges. The application is generally flexible to be configured based on specific customer requirements. Optionally method 700 can include automatically sending the analysis from the analyzing step to a responsible individual, generally including issuing alert of cybersecurity non-compliance, such as by sending a message or an email notification.

Step 704 comprises mitigation in the case of a deviation including recovering and resolving deviations to enable again becoming cyber-compliant. Method 700 provides remediation from the mitigation of cybersecurity issues such as unauthorized cybersecurity system changes resulting in a stronger cybersecurity compliance system to enable avoiding changes/attacks disrupt operations and/or cause unsafe conditions in systems such as in an industrial PCS.

Method 700 provides several significant benefits for customers. These benefits include probably eliminating or reducing cybersecurity vulnerabilities and compliance risks. Also provided is improving and sustaining cybersecurity compliance with industrial cybersecurity standards. Disclosed methods make cybersecurity compliance easier to follow, by making cybersecurity auditing more transparent and relatively easy to sustain. Method 700 also improve manageability of Operational Technology (OT) and IT systems. Method 700 also enables centralized management of global cybersecurity policies, as well as compatibility with systems including Industrial PCSs. Disclosed methods also provide implementation of group cybersecurity policies and procedures for users and computers and the ability to safely disable unused or legacy services. Method 700 also enables refining user rights assignments and access policies. Moreover, method 700 also supports a variety of operating systems, such as WINDOWS operating systems one example. Disclosed methods are generally applicable to a variety of network devices, such as switches, routers and firewalls.

Believed to be novel features for this disclosed aspect include automated evaluation and a control algorithm for a cybersecurity non-compliant system which identifies, analyze and mitigate non-compliance policies for systems including for industrial PCS infrastructure and network(s). This disclosed aspect has unique capability with automated evaluation and control algorithm which identifies compliant settings/policies, analyze (if any change takes place either authorized or unauthorized) and mitigate (to meet the cybersecurity hardening and compliant baselines) responsive to unauthorized cybersecurity settings or policy changes that can take place for otherwise healthy, hardened and cyber-compliant industrial control system infrastructure.

Conventional cybersecurity compliant assessment solutions do not help users to automatically identify, analyze and mitigate the cyber compliance of Industrial PCS infrastructure and network. It is recognized that customers are facing a hard time to keep track of cybersecurity non-compliant systems and their settings. This is generally not one-time activity that any available cybersecurity solution can fulfill the requirement. Customers want to monitor their infrastructure with respect to cybersecurity compliant settings/policies, analyze (if any change takes place either authorized or unauthorized) and mitigate (to meet the cybersecurity hardening and complaint baselines) all the time as soon as any unauthorized cybersecurity settings or policy changes take place, which pinpoints vulnerabilities, gaps with industry accepted best practices to the architecture, configuration, and ongoing management of Industrial PCS assets.

Method 700 can also perform an automated evaluation and control algorithm of Cyber Compliance in industrial PCS infrastructure and network, where the algorithm identifies, analyze and mitigate cyber non-compliant settings/policies based on configured/present compliant policies for healthy, hardened and cyber compliant of the Industrial System Infrastructure as mentioned below. Method 700 also can define the cybersecurity compliance as per a cybersecurity industry standard, as well as the additional capability to define and baseline of custom cybersecurity compliance as per a particular organization requirement.

Example industry standard minimum password length policy specifies the number of characters in the password to be between 0 to 8. However, in a disclosed method based on method 700, a customer can define custom compliance of minimum password length policy number between 0 to 12 characters, and also baseline this custom password policy which can help avoid any type of vulnerability associated with passwords.

Method 700 has the capability to define all the cybersecurity compliance policies in the infrastructure and baseline of defined custom or standard cybersecurity compliance polices. Method 700 can also define the (is "the" this the correct missing word?) [Bassi, Atul] Yes stage (ATUL please clarify) [Bassi, Atul] Version Management sustain/track the changes specific to process as Cybersecurity Compliance Policy Example: Customer setup the cybersecurity compliance policy with the changes as per requirement of their industries and base line the same if any further changes in the system which require to update the version number from last version with detailed specification of changes/authorization so which can be easily track when the changes occur. the version management in case of change in cybersecurity compliance policies and baseline and log the vulnerability and tracking of cybersecurity compliance policies. These (these what?) [Bassi, Atul] These means our solution can include add/modify/delete rules, flexibility, built-in-templates, custom baseline, import/export, and industry standards.

This disclosed aspect has the capability to Define the compliance as per the industry standard along with the additional capability to define and baseline custom compliance as per a custom organization requirement.

An Example of an Industry standard is the minimum password length policy specified number of characters between 0 to 8 but in proposed solution customer can define custom compliance of minimum password length policy number between 0 to 12 characters and baseline the policy which can avoid any type of vulnerability.

Define model have the capability to define all the compliance policies in the Infrastructure and baseline of defined custom/standard compliance polices. Define stage includes the version management in case of change in compliance policies and baseline and Log the vulnerability and tracking of compliance policies.
    Add/Modify/Delete Rules
    Flexibility
    Built-in-Templates
    Custom Baseline
    Import/Export
    Industry Standards Analyze, Algorithm should continuously monitor the configured site and analyze 24*7. In case of any deviation detected from the configured compliance policies/rules, it will perform the analysis of changes in the system considering Criticality, Impact, Risk Score, Privileges etc. with analysis algorithm and then send the analysis to take the mitigation action for cyber compliant.
    Vulnerabilities
    Misconfiguration
    Unauthorized Changes
    Authorized changes
    Tracks all Changes
    System health Mitigation, Process of mitigation: The captured inputs from the Analysis stage will be used to Mitigate with the required Privileges and settings to perform the necessary action, recover and resolve the deviation to maintain the systems in healthy state, hardened and cyber compliant.

Work Flow:
1. The proposed solution collects the configured compliance policies data of industrial control system collected from the each of the end-node, and addition it's also includes the capability as to collect the data on demand as Automatically/Manual schedule of collection of configured Compliance policies.
2. Algorithm engine run 24*7 and it analyzes the each of end node in the infrastructure. Compliance policies always analyze with the baseline policies to make sure the infrastructure is healthy, hardened and cyber compliant. In case of any deviation detect in compliance policies during analysis, deviation of changes in the system considering criticality, impact, risk score, privileges etc. and mitigate the deviation by recover and resolve the baseline policies and notify to operation team using alert message.
3. Alert/Alarm will raise in case of any deviation than baseline to operator/administrator to aware/alert about the deviation occurs in Infrastructure which also enable the confidence of Customer. Excel/PDF report can generate as on demand and place in a dedicated repository for the refence of analysis data of cyber compliance.

Mitigation
    Alerts in case deviation
    Safely disable unused or legacy services
    Support OT and IT Infrastructure
    Recover and Resolve Deviations
    Impact on Assets
    Non-Compliance
    Eliminates or reduces Vulnerabilities
    Eliminates Compliance Risk
    Improves Manageability Remediation, Process of identification, analysis and mitigation outcome shall improve the situation and makes stronger cyber compliant system to avoid these types of changes/attacks to disrupt operations or cause unsafe conditions in an industrial facility.

Disclosed aspects can be applied to generally to a wide variety of networks, to provide cybersecurity compliance data which enables changes to be made that can improve the network cybersecurity hardness. For example, a process control network, IT network, OT network, campus network, local area network (LAN), or wide area network (WAN).

While various disclosed aspects have been described above, it should be understood that they have been presented by way of example only, and not limitation. Numerous changes to the subject matter disclosed herein can be made in accordance with this Disclosure without departing from the spirit or scope of this Disclosure.

In addition, while a particular feature may have been disclosed with respect to only one of several implementations, such feature may be combined with one or more other features of the other implementations as may be desired and advantageous for any given or particular application.

The invention claimed is:

1. A method of cybersecurity performance analysis for at least one customer site including assets configured in a networked system comprising a plurality of different asset types including at least one virtual security engine (VSE) server communicably connected to the assets, the customer site communicably coupled to a Security Center (SC) including a SC server having a SC database, and a cybersecurity hardening compliance engine (CHCE), the method comprising:
   collecting, by the VSE server, identification data, and security configuration data from the assets in the plurality of the asset types;
   transferring the identification data and the security configuration data to the SC database;
   generating a cybersecurity hardening compliance report, the CHCE:
      sending a query to the SC database to retrieve at least a portion of the identification data and the security configuration data;
      uploading a cybersecurity benchmark including a plurality of cybersecurity configuration rules (CCRs) including for least a selected one of the plurality of asset types;
      wherein for the selected asset type comparing the collected identification data and security configuration data of the assets to the plurality of CCRs, and
      performing a calculation based on results from the comparing to generate a cybersecurity report that includes a quantitative measure of the cybersecurity performance for the assets of the selected asset type.

2. The method of claim 1, wherein the SC further comprises a benchmarks repository having the cybersecurity benchmark, further comprising a user managing the benchmark repository including at least one of deleting or modify parameters or thresholds of at least one of the CCRs, or adding at least one new CCR, and attaching a new cybersecurity benchmark to at least one of the plurality of asset types.

3. The method of claim 1, wherein a frequency at which the CHCE retrieves information from the SC database is less than a frequency at which the VSE server transfers the identification data and the security configuration data to the SC database.

4. The method of claim 1, further comprising generating an alert when the quantitative measure of the cybersecurity performance for the any of the assets of the selected asset type falls below a predetermined limit.

5. The method of claim 1, further comprising when the quantitative measure of the cybersecurity performance for the any of the assets of the selected asset type falls below a predetermined limit mitigating comprising automatically changing at least a portion of the security configuration data to meet the predetermined limit.

6. The method of claim 1, wherein the communicatively coupled comprises the VSE server connected through a logical line to the SC, where the SC is positioned at an enterprise level relative to the customer site.

7. The method of claim 1, wherein the networked system comprises a process control system.

8. The method of claim 1, wherein the at least one customer site comprises a plurality of customer sites including two or more physical locations.

9. The method of claim 1, wherein the VSE server performs the collecting using at least one script.

10. The method of claim 1, wherein the SC is located remote from the customer site.

11. The method of claim 1, wherein the identification data and the security configuration data of a first of the assets that was used in the comparing comprises at least one of a vendor for the first asset, the asset type of the first asset, an operating system version for the first asset, and a role for the first asset.

12. A non-transitory computer-readable medium containing instructions that when executed cause a method of cybersecurity performance analyzing to be implemented involving at least one customer site that includes assets configured in a networked system comprising a plurality of different asset types including at least one virtual security engine (VSE) server communicably connected to the assets, the customer site communicably coupled to a Security Center (SC) including a SC server having a SC database, and a cybersecurity hardening compliance engine (CHCE), the method comprising:
   the VSE server collecting identification data and security configuration data from the plurality of asset types;
   transferring the identification data and security configuration to the SC database;
   responsive to a user request to the SC to generate a cybersecurity hardening compliance report the CHCE:
      sending a query to the SC database to retrieve at least a portion of the identification data and the security configuration;
      uploading a cybersecurity benchmark including a plurality of cybersecurity configuration rules (CCRs) including for at least the selected one of the plurality of asset types,
      wherein for the selected asset type comparing the identification data and the security configuration data of the assets to the plurality of CCRs, and
      performing a calculation based on results from the comparing to generate a cybersecurity report that includes a quantitative measure of the cybersecurity performance for the assets of the selected asset type.

13. The non-transitory computer readable medium of claim 12, wherein the at least one customer site comprises a plurality of remotely located ones of the customer sites.

14. The non-transitory computer readable medium of claim 12, wherein the SC further comprises a benchmarks repository having the cybersecurity benchmark, wherein the instructions further comprise instructions that allow the user to manage the benchmark repository including at least one of deleting or modify parameters or thresholds of at least one of the CCRs, or adding at least one new CCR, and attaching a new cybersecurity benchmark to at least one of the asset types.

15. The non-transitory computer readable medium of claim 12, further comprising generating an alert when the quantitative measure of the cybersecurity performance for at least a first asset of the assets of the selected asset type falls below a predetermined limit.

16. The non-transitory computer readable medium of claim 12, further comprising when the quantitative measure of the cybersecurity performance for at least a first asset of the assets of the selected asset type falls below a predetermined limit, mitigating comprising automatically changing at least a portion of the security configuration data for the first asset to meet the predetermined limit.

17. The non-transitory computer readable medium of claim 12, wherein the transferring of the identification data and security configuration data is transferred at a predefined time interval.

18. A method, comprising:
- in a network comprising a plurality of communicatively connected assets comprising asset types including at least one of routers, switches, firewalls or computers, automatically collecting from each of the plurality of assets identification data and security configuration data, the identification data identifying the asset type of the asset, and the security configuration data identifying a current security data of the asset;
- determining based on the asset type at least one cybersecurity benchmark including a plurality of cybersecurity configuration rules (CCRs) for each of the plurality of assets;
- comparing, for each of the plurality of assets, the security configuration data against the cybersecurity benchmark;
- determining, for each of the plurality of assets, based on the comparing, whether the security configuration data meets the cybersecurity benchmark, wherein determining whether the security configuration data meets the cybersecurity benchmark comprises calculating, based at least in part on the comparing, a quantitative measure, and
- for each of the plurality of assets, in accordance with the determining finding that at least a portion of the security configuration data fails to meet at least a portion of the cybersecurity benchmark, generating an alert based at least in part on the quantitative measure.

19. The method of claim 18, wherein the generating of the alert further comprises generating:
- an indication of at least a first asset of the plurality of assets that fails to meet at least a portion of the cybersecurity benchmark, and
- at least one of i) an indication that the cybersecurity benchmark for the first asset, and ii) a recommendation to a change to at least a portion of the security configuration data for the first asset that, after being implemented, meets the cybersecurity benchmark for the first asset.

20. The method of claim 18, further comprising:
- for at least a first asset of the of the plurality of assets for which the determining finds that the first asset fails to meet at least a portion of the cybersecurity benchmark, automatically changing at least a portion of the security configuration data for the first asset, wherein a change made in accordance with the changing changes at least the portion of the security configuration data for the first asset meets the cybersecurity benchmark.

* * * * *